United States Patent [19]

Takahashi et al.

[11] 4,320,824
[45] Mar. 23, 1982

[54] CLUTCH HOUSING FOR A TRANSMISSION

[75] Inventors: Kotei Takahashi, Tokyo; Teruo Endo, Fujisawa; Masayuki Kawaguchi, Tokyo, all of Japan

[73] Assignee: Nissan Motor Company, Limited, Yokohama, Japan

[21] Appl. No.: 109,641

[22] Filed: Jan. 4, 1980

[51] Int. Cl.$^3$ .............................................. F16D 13/68
[52] U.S. Cl. ................................ 192/115; 192/110 S
[58] Field of Search ............... 192/112, 110 R, 110 B, 192/110 S, 115, 98; 74/606 R

[56] References Cited

U.S. PATENT DOCUMENTS

| | | | |
|---|---|---|---|
| 1,164,531 | 12/1915 | Kwis | 192/112 X |
| 3,509,975 | 5/1970 | Long | 192/110 R |
| 3,610,384 | 10/1971 | Borck | 192/98 X |

FOREIGN PATENT DOCUMENTS 489887  1/1976  U.S.S.R. ........................ 192/110 S

*Primary Examiner*—George H. Krizmanich
*Attorney, Agent, or Firm*—Thompson, Birch, Gauthier & Samuels

[57] ABSTRACT

A clutch housing for the transmission of an automotive vehicle has an integral front cover, and a release bearing sleeve formed separately from and detachably secured to the front cover in communication with a stepped hole extending therethrough. An input shaft extends through both the stepped hole and the release bearing sleeve. The input shaft is rotatably supported by a bearing located in the stepped hole. An oil seal surrounds the input shaft and is retained within the release bearing sleeve at a location spaced axially from the bearing.

6 Claims, 3 Drawing Figures

CLUTCH HOUSING FOR A TRANSMISSION

BACKGROUND OF THE INVENTION

The present invention relates to a transmission of an automotive vehicle, and more particularly relates to a clutch housing for a transmission formed integrally with a front cover.

In general, a conventional housing of a transmission and particularly a clutch housing equipped with a clutch mechanism therein is designed to contain therein a transmission mechanism in cooperation with a transmission casing. In order to facilitate the assembly, disassembly and inspection of the transmission mechanism, or the replacement of parts, a front cover is usually attached to the clutch housing by screw means or the like, the cover being separate from the clutch housing. An input shaft and main shaft in the transmission are journaled on the front cover at their ends. When the front cover is detached or removed from the clutch housing, it becomes possible to remove the shafts, oil seals for the shafts, bearings, and other parts from the interior of the transmission casing.

However, the assembly or inspection of the transmission is often difficult in actual practice if only the front cover is detached from the clutch housing. Therefore, it is not unusual to disassemble the whole of the transmission casing and/or the clutch housing. In such a case, it is not significant that the front cover is formed separate from the clutch housing.

Taking into consideration the foregoing, a clutch housing formed integrally with the front cover has been proposed so as to overcome such defects of the prior art clutch housing equipped with the front cover as, for example, the increase of the parts and the steps for production thereof.

It should be noted, however, that an element as an oil seal is not durable so that it must be replaced relatively often. In the clutch housing formed integrally with the front cover, it is extremely difficult to exchange only the oil seal. Thus, the whole of the transmission must be disassembled in order to exchange only the oil seal.

SUMMARY OF THE INVENTION

Therefore, it is an object of the present invention to provide a clutch housing for a transmission of an automotive vehicle in which an oil seal can be easily replaced.

Another object of the present invention is to provide an improved clutch housing for a transmission which can increase the advantages of having a front cover formed integrally therewith.

According to the present invention, a clutch housing for a transmission of an automotive vehicle includes a release bearing sleeve formed separate from the clutch housing. The release bearing sleeve is detachably secured to the clutch housing, for example, by screw means or pressure-fitting means. An oil seal is attached onto the release bearing sleeve so as to provide a seal between the release bearing sleeve and the input shaft when the release bearing sleeve is positioned in an opening of the clutch housing.

BRIEF DESCRIPTION OF THE DRAWINGS

These and other objects, features and advantages of the present invention will become more apparent from the following description of the preferred embodiments thereof when read in conjunction with the accompanying drawings in which.

DETAILED DESCRIPTION OF THE PREFERRED EMBODIMENTS

Figure 1:
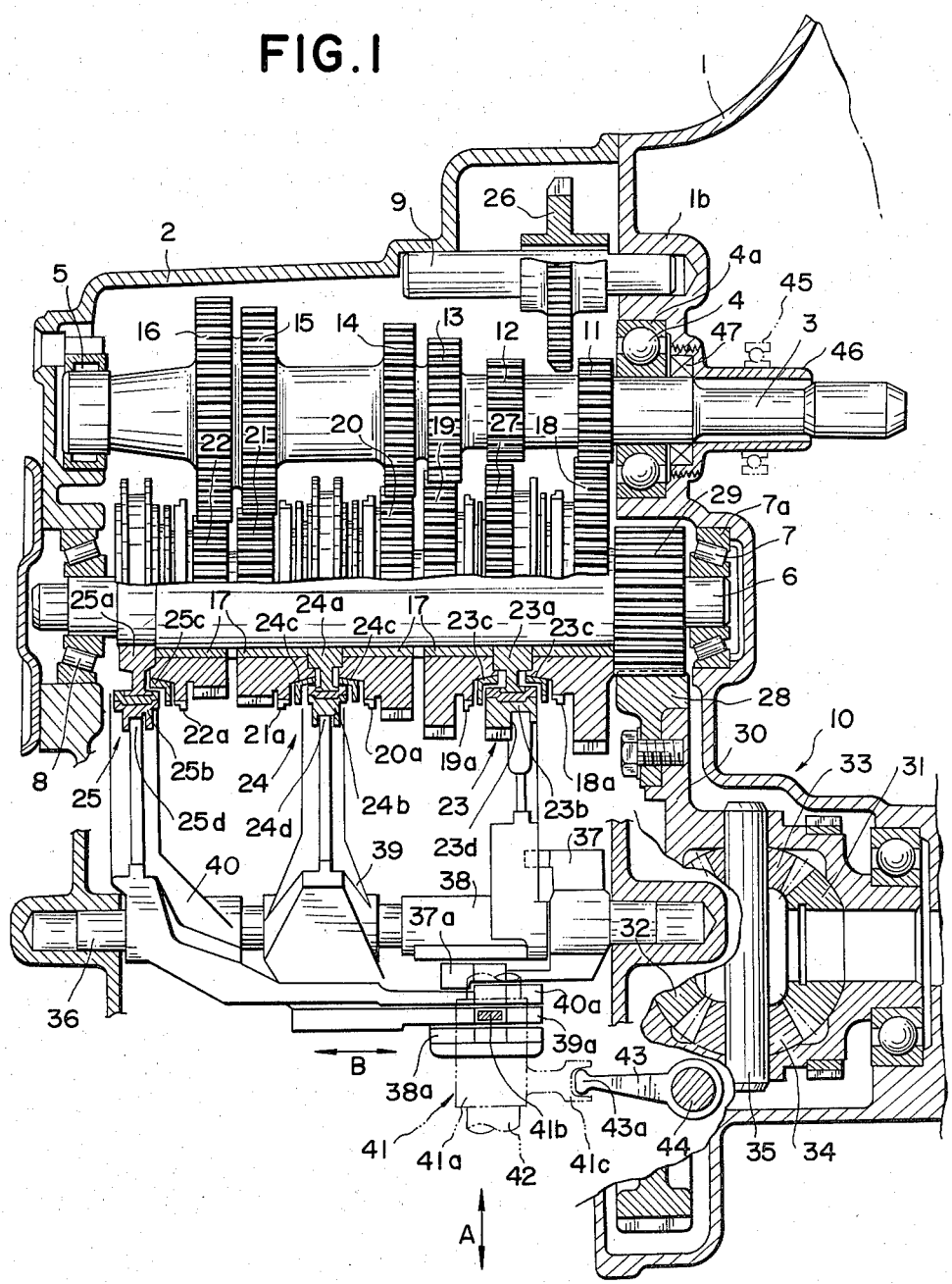
FIG. 1 is a schematic sectional view showing a transmission equipped with a clutch housing according to the present invention.

Referring to FIG. 1, there is shown a transmission for a engine front drive type automotive vehicle according to the present invention. The clutch housing 1 is attached to an engine body (not shown). The front cover 1b is formed as an integral part of the clutch housing 1. The front cover has as its central portion a stepped through hole having a minimum diameter first portion 1A, an intermediate second portion 1B with a diameter larger than that of portion 1A and a third portion 1C having a diameter larger than that of portion 1B. The transmission casing 2 is attached to the clutch housing 1 so as to define a transmission chamber. The input shaft 3 is supported at its ends by the clutch housing 1 and the transmission casing 2, respectively, through the bearings 4 and 5. The input shaft 3 has at its right end in the figure a clutch mechanism (not shown) which can be installed within the clutch housing 1, so that the input shaft 3 can be driven by the engine power. The main shaft 6 is supported by the bearings 7 and 8 in parallel to the input shaft 3. The idle shaft 9 is fixed onto the upper portion of the clutch housing 1 and the transmission casing 2. The differential gear 10 is positioned below the main shaft 6.

As viewed from right to left in FIG. 1, the input shaft 3 has the first gear 11, reverse gear 12, second gear 13, third gear 14, fourth gear 15 and over-drive gear 16, integrally formed therewith. Except for the reverse gear 12, the respective gears of the input shaft 3 are always meshed with the first gear 18, second gear 19, third gear 20, fourth gear 21 and over-drive gear 22 which are rotatably supported through the bushes 17 by the main shaft 6. Synchronizers 23, 24 and 25 are arranged between the first gear 18 and the second gear 19, between the third gear 20 and the fourth gear 21, and at a side of the over-drive gear 22, respectively. The synchronizers 23, 24, 25 each have synchrohubs 23a, 24a, 25a attached fixedly onto the main shaft 6, coupling sleeves 23b, 24b, 25b in spline connection therewith, and baulk rings 23c, 24c, 25c, all of which are well known in the art. By the axial movement of any one of the coupling sleeves 23b, 24b, 25, the coupling sleeve 23b becomes selectively meshed with either clutch gears 18a or 19a of the first gear 18 and second gear 19, another coupling sleeve 24b becoming meshed selectively with either clutch gears 20a or 21a of the third and fourth gears 20, 21, and the last coupling sleeve 25b becoming selectively meshed with the clutch gear 22a of the overdrive gear 22, whereby any one of the gears 18 through 22 can be connected with the main shaft 6. The reverse gear 12 is to be meshed with the reverse gear 27 formed on the periphery of the coupling sleeve 23b through the idle gear 26 rotatably supported by the idle shaft 9 when the idle gear 26 is axially moved.

The drive gear 28 in parallel to the main shaft 6 is meshed with the drive pinion 29 formed integrally with the right end of the main shaft 6. The differential gear casing 30 is fixedly attached to the drive gear 28. The numerals 31 and 32 designate the side gears to be attached to axle means (not shown). The pinion mates 33, 34 are supported by the pinion-mate shaft 35, respectively.

A system for operating the synchronizers 23, 24 and 25 will be now described. A fork rod 36 is supported at its ends by the housing 1 and the casing 2 in such a way that it can move axially in a direction parallel to the main shaft 6 within a limited range. The four forks 37, 38, 39, 40 are each attached at one end to the forks shaft 36. The fork 38, 39, 40 are inserted at their other ends in the fork grooves 23d, 24d, 25d of the coupling sleeves 23b, 24b, 25b of the synchronizers 23, 24, 25 so that they can move axially together with the coupling sleeves 23b, 24b, 25. The fork 37 is to move together with the idle gear 26 in the axial direction. Each end 37a, 39a, 40a of the forks 37, 39, 40 extends axially so as to be positioned side by side on the shaft of the fork 38 in such a way that a channel-shape end 38a of the fork 38 can hold them therein, with the shifter engaging grooves thereof.

The shifter 41 includes a cylindrical body 41a which is rotatable around and axially movable along the shaft 42 fixed in a vertical direction in the figure. The pawl 41b projecting from the cylindrical body 41a is positioned at its front end in the shifter engaging groove 45. The left end of the operation arm 43 is engaged with the arm 41c protruding in the direction perpendicular to the pawl 41b.

The striking rod 44 is arranged in a direction perpendicular to the main shaft 6 with its right end being connected through a linkage to a control lever which is usually provided near the driver's seat so that the striking rod can be rotated and axially moved by the operation of the control lever. The operational arm 43 is fixed at its base portion onto the striking rod 44 in a perpendicular direction thereto. The globular portion 43a of the operation arm 43 is engaged with the recessed front portion of the arm 41c. Thus, the shifter 41 can be axially moved along the shaft 42 by the rotation of the striking rod 44 while it can be rotated around the shaft 42 by the axial movement of the striking rod 44.

The clutch housing 1 is equipped with the front cover 1b formed integrally therewith. In particular, the outer race 4a of the bearing 4 for supporting the right hand end of the input shaft 3 and the outer race 7a of the bearing 7 for supporting the right hand end of the main shaft 6 are fixedly secured to the clutch housing 1 so as to reduce the number of the parts and the assembly steps thereof. The outer race 4a of the bearing 4 is fixed onto the large diameter hole portion 1C in such a manner that as viewed in the drawings, the right hand end surface of the outer race 4a contacts the end wall of the larger diameter hole portion 1C and is thus prevented from moving in the right hand direction.

Figure 2:
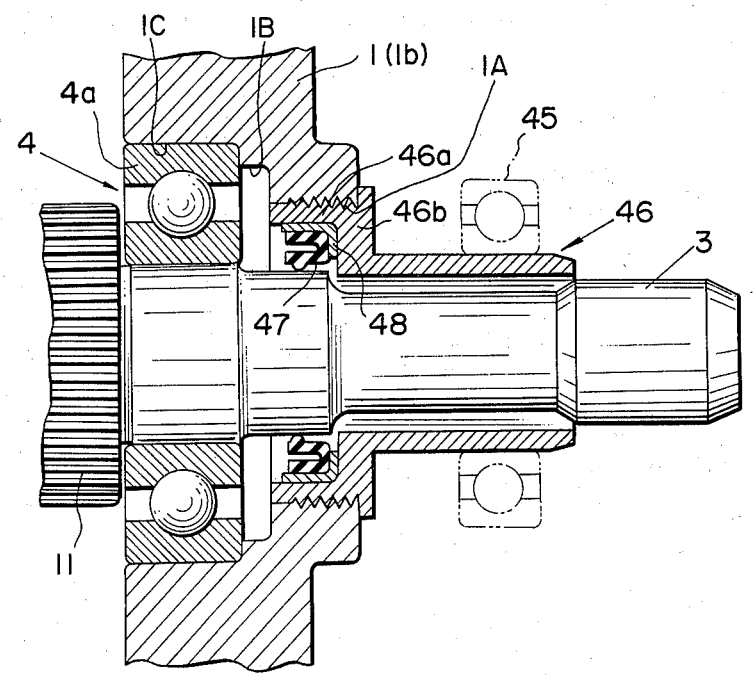
FIG. 2 is an enlarged sectional view showing a portion of the clutch housing shown in FIG. 1.

According to the present invention, the release bearing sleeve 46 for supporting the release bearing 45 for the purpose of supporting a clutch mechanism (not shown) is formed separate from the clutch housing 1 as shown in FIG. 2. The hole portion 1A is internally provided with a female screw thread. A male screw thread is formed on the base portion 46a of the release bearing sleeve 46 formed separate from the clutch housing 1. The release bearing sleeve 46 is detachably screwed onto the clutch housing 1 by means of the male and female screw threads in cooperation with the two flat portions (not shown) formed on the periphery thereof which are opposite to each other. When the male screw thread of the release bearing sleeve 46 is completely engaged with the female screw thread of the clutch housing 1, the inner end of the release bearing sleeve 46 is in alignment with the end wall of the intermediate hole portion 1B. Thus, the inner end of the release bearing sleeve 46 is spaced from the right hand end of the bearing 4 by the length of the intermediate hole portion 1B. The annular oil seal 47 is fixedly attached together with the back plate 48 therefor into the annular space defined by the stepped portion 46b in the base portion of the release bearing sleeve 46. The oil seal 47 is to avoid the leakage out of the clutch housing 1 by contacting the outer surface of the input shaft 3.

According to the above-stated structure, if the release bearing sleeve 46 is rotated in a predetermined direction to detach from the clutch housing 1, the oil seal 47 can be removed together with it from the clutch housing 1. On the contrary, if the release bearing sleeve 46 is attached to the clutch housing 1, then the oil seal 47 can be attached to the clutch housing 1 at the same time. Therefore, it is easy to replace the oil seal 47 which is not durable.

In the embodiment of FIG. 2, screw means is used for the purpose of attaching the release bearing sleeve 46. However, pressure fitting means can be used in place thereof.

Figure 3:
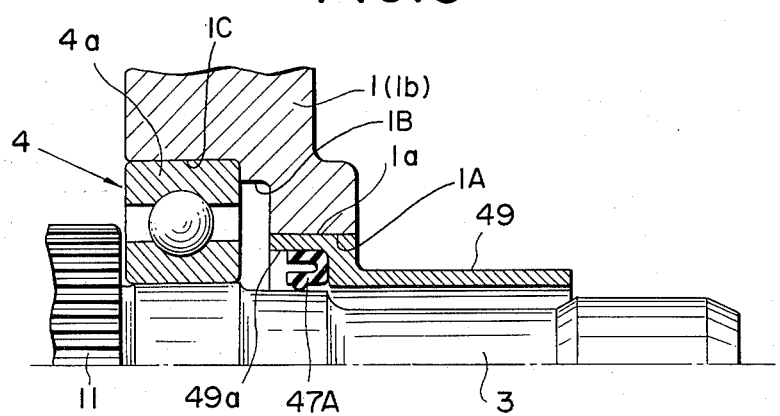
FIG. 3 is a sectional view similar to FIG. 2 showing another embodiment of the present invention.

FIG. 3 shows another embodiment of the present invention. The oil seal 47A sticks directly to the release bearing sleeve 49. More particularly, the periphery of the oil seal 47A sticks by heat onto the inner surface of the base portion 49a of the release bearing sleeve 49. The base portion 49a of the release bearing sleeve 49 is pressure-fitted into the hole portion 1A. It should be noted that any other fitting means can be used in place thereof.

According to the embodiment of FIG. 3, as soon as the release bearing sleeve 49 is detached from the clutch housing 1, the oil seal 47A can be easily removed from the release bearing sleeve 49. Thus, it is very convenient to replace the oil seal 47A if desired. In addition, the number of the parts can be reduced because the oil seal is directly attached onto the release bearing sleeve.

As can be seen from the foregoing, according to the present invention, the release bearing sleeve and the clutch housing are separately formed so that they are detachable one from the other, and the oil seal is attached to the release bearing sleeve. Consequently, if the release bearing sleeve is detached from the clutch housing, the oil seal can be automatically removed from the clutch housing. As a result, it is easy to exchange an oil seal when desired.

We claim:
1. In combination:
a clutch housing for the transmission of an automotive vehicle, said housing having an integral front cover with a stepped hole extending therethrough, said hole having a first minimum diameter portion, an intermediate second portion with a diameter larger than that of said first portion, and a third portion having a diameter larger than that of said second portion;
an input shaft extending through said hole;
a bearing for rotatably supporting said input shaft, said bearing having an outer race seated within said third hole portion and fixed relative to said front cover, and an inner race surrounding and fixed relative to said input shaft;

a release bearing sleeve surrounding said input shaft, said bearing sleeve being detachably secured to said front cover and having an enlarged diameter base portion received in the first minimum diameter portion of said hole, said base portion being spaced from said bearing by the axial length of the intermediate second portion of said hole; and, an oil seal surrounding and in sealing contact with said input shaft, said oil seal being surrounded by and fixed relative to the enlarged diameter base portion of said release bearing sleeve.

2. The combination of claim 1 wherein said release bearing sleeve is detachably secured to said front cover by threadedly engaging its enlarged diameter base portion within the first minimum diameter portion of said hole.

3. The combination of claim 1 wherein said release bearing sleeve is detachably secured to said front cover by press-fitting its enlarged diameter base portion into the first minimum diameter portion of said hole.

4. The combination of claim 1 wherein said oil seal is received within an internal groove in the enlarged diameter base portion of said release bearing sleeve.

5. The combination of claim 4 wherein said oil seal is non-metallic and surrounded by a metallic ring seated in said internal groove.

6. The combination of claim 4 wherein said oil seal is non-metallic and is adhered directly to the surfaces of said internal groove.

* * * * *